E. HEATH, Dec'd.
P. HEATH, Administratrix.
HARVESTER BINDER.

No. 269,053. Patented Dec. 12, 1882.

Attest.
W. H. H. Knight
W. Blackstock

Inventor.
Edward Heath
by L. Hill
His Attorney.

E. HEATH, Dec'd.
P. HEATH, Administratrix.
HARVESTER BINDER.

No. 269,053.

7 Sheets—Sheet 3.

Patented Dec. 12, 1882.

Attest,
W. H. H. Knight
W. Blackstock

Inventor,
Edward Heath
by L. Hill.
His Attorney.

E. HEATH, Dec'd.
P. HEATH, Administratrix.
HARVESTER BINDER.
No. 269,053. Patented Dec. 12, 1882.
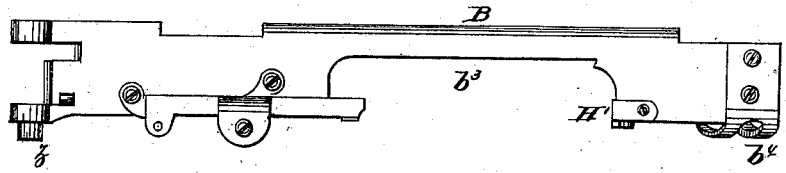
Fig. 5
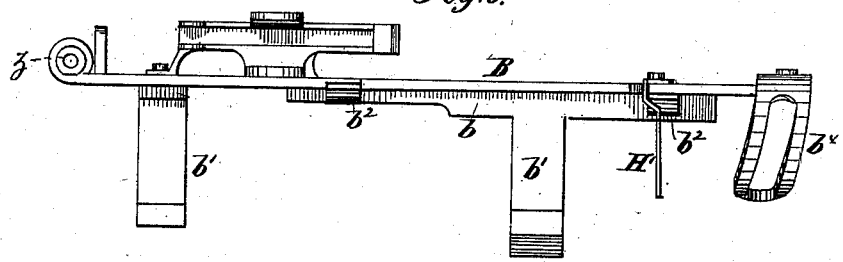
Fig. 6.
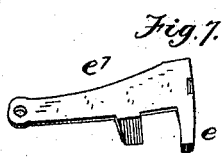
Fig. 7.
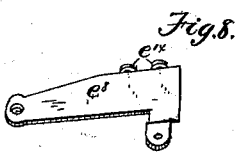
Fig. 8.
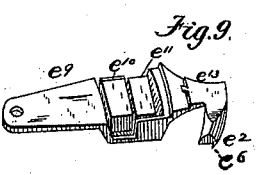
Fig. 9.
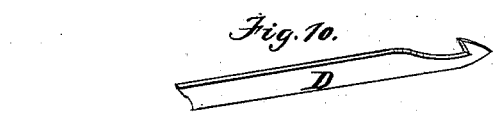
Fig. 10.
Fig. 11.
Fig. 12.
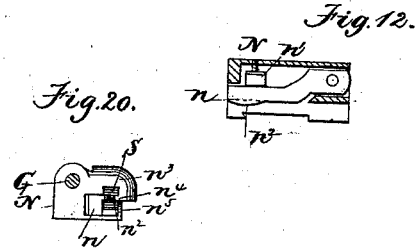
Fig. 20.
Attest,
W. H. H. Knight
W. Blackstock.
Inventor,
Edward Heath
by L. Hill,
His Attorney.

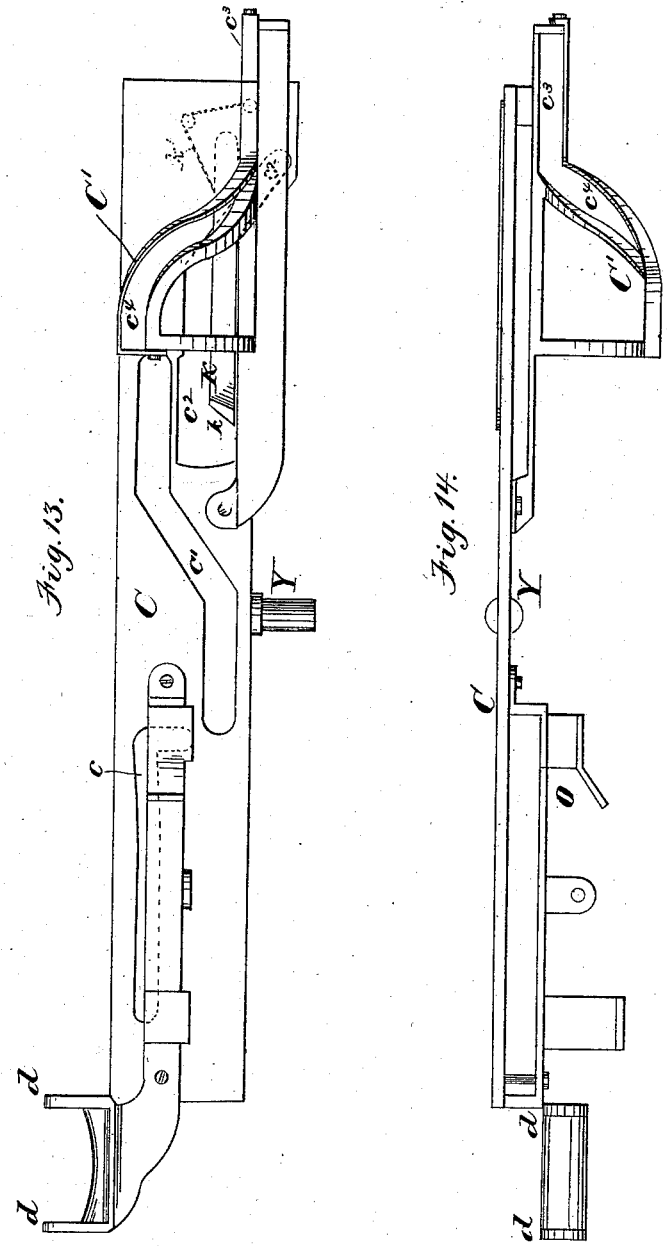

E. HEATH, Dec'd.
P. Heath, Administratrix.
HARVESTER BINDER.
No. 269,053.    Patented Dec. 12, 1882.
7 Sheets—Sheet 7.
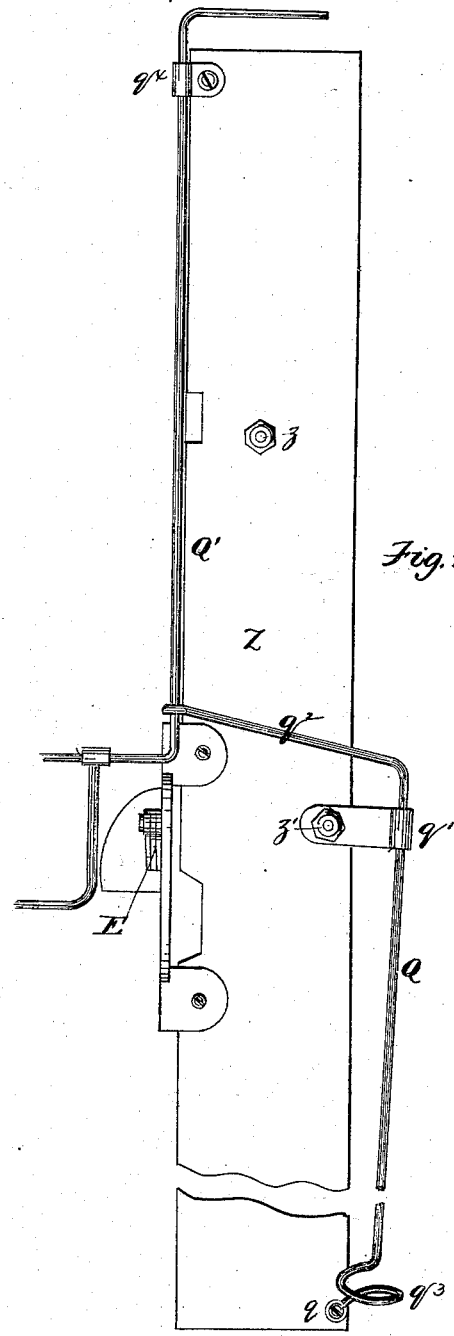
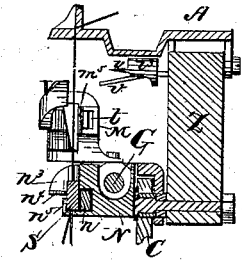
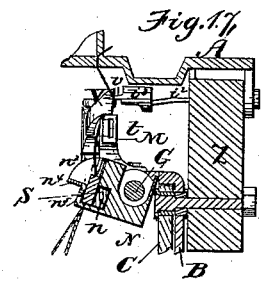
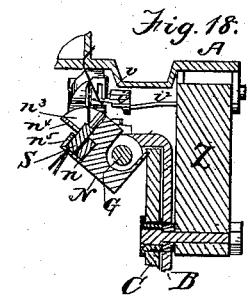
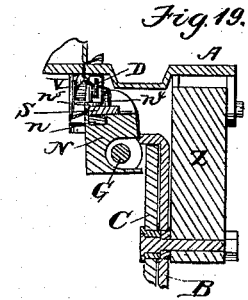

United States Patent Office.

EDWARD HEATH, OF BROCKPORT, NEW YORK; POLLY HEATH, ADMINISTRATRIX OF SAID EDWARD HEATH, DECEASED, ASSIGNOR TO THE JOHNSTON HARVESTER COMPANY, OF SAME PLACE.

HARVESTER-BINDER.

SPECIFICATION forming part of Letters Patent No. 269,053, dated December 12, 1882.

Application filed March 11, 1879.

*To all whom it may concern:*

Be it known that I, EDWARD HEATH, of Brockport, in the county of Monroe and State of New York, have invented a certain new and improved Harvester-Binder; and I do hereby declare the following to be a full, clear, and exact description of the same, reference being had to the accompanying drawings, forming part of this specification, in which—

Figure 1:
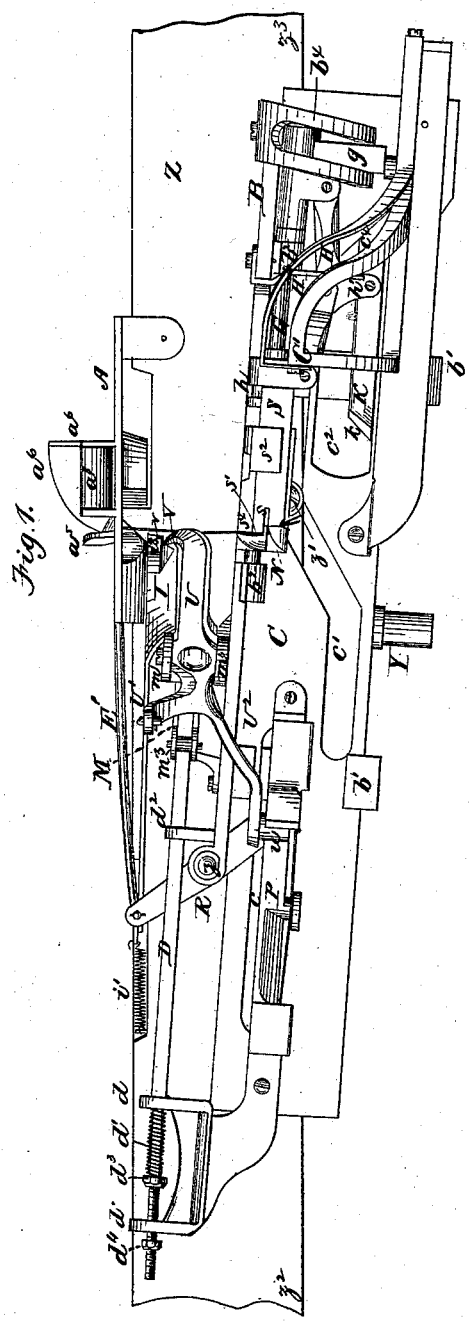
Figure 2:
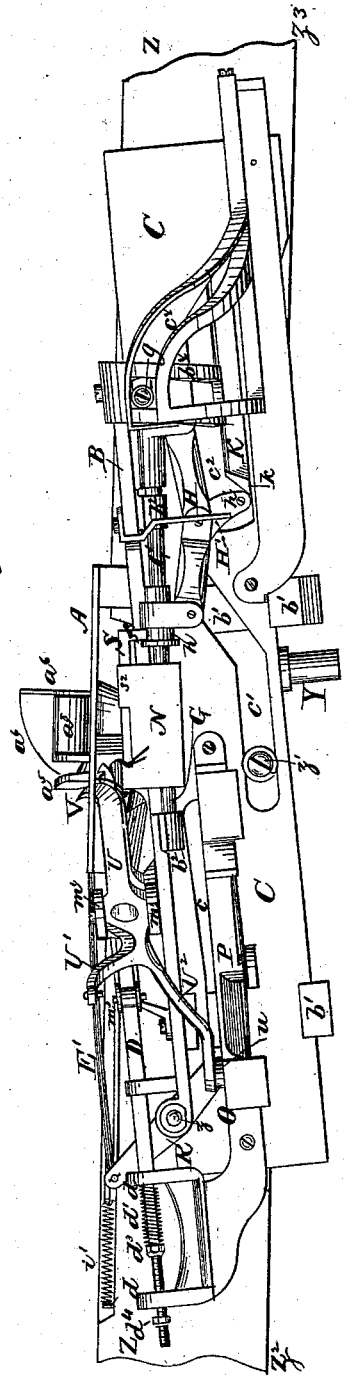
Figure 3:
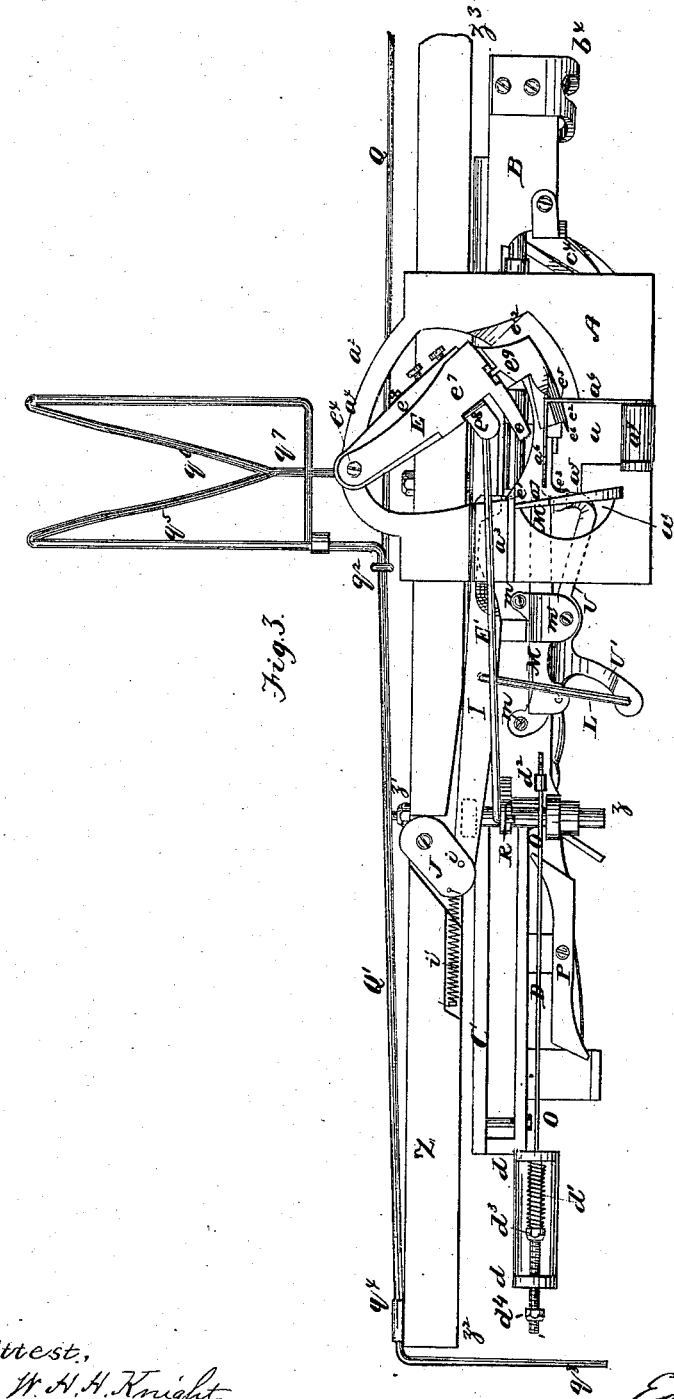
Figure 4:
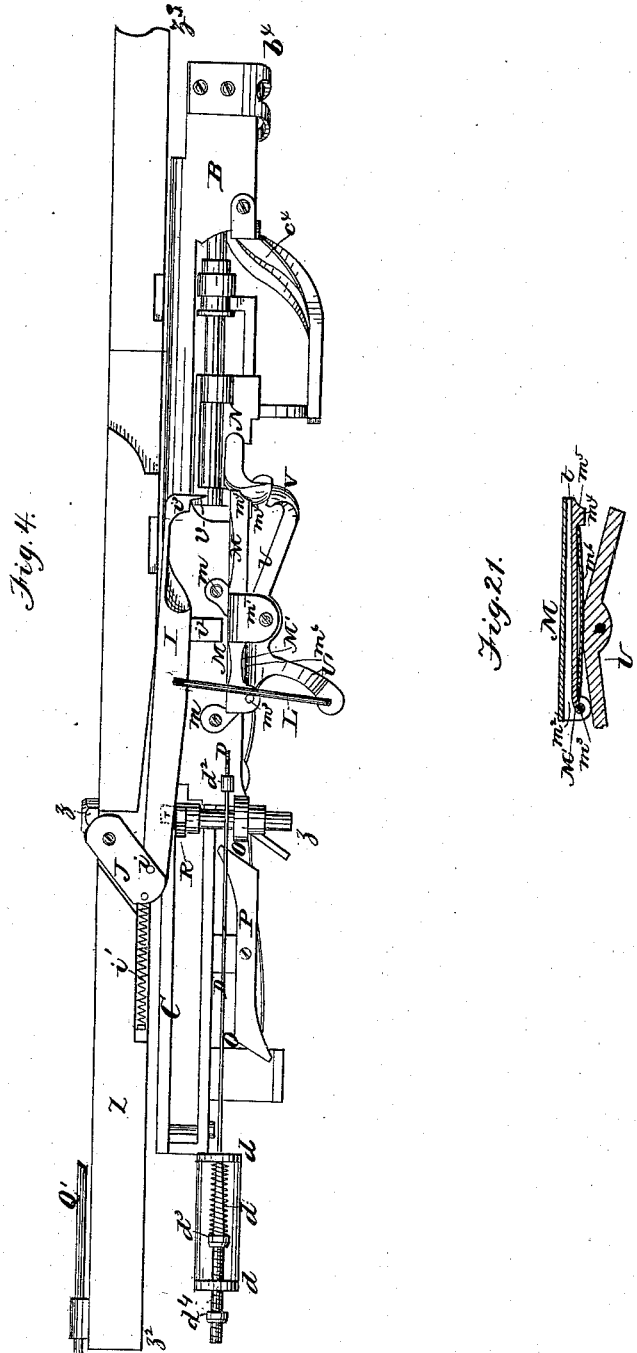

Figure 1 is a side elevation, showing the cord held in the lower clamping-jaws and the position of the parts before the looping and tying operations commence. Fig. 2 is a similar view, showing the position of the parts after the loop has been formed and prior to the completion of the knot by the retraction of the tying-bar. Fig. 3 is a top plan view. Fig. 4 is a similar view with upper clamping-plate removed to better show the arrangement of parts beneath. Fig. 5 is a top plan view of the pivoted vertically-oscillating plate or frame which supports the looping jaw or head, the lower clamp, and the cutter, and in part supports the tying-hook and the cam-plate. Fig. 6 is a side elevation of said plate or frame. Figs. 7, 8, 9, and 11 represent detail views of parts of the upper clamps. Fig. 10 is a perspective view of the barbed end or hook of the tying-bar. Fig. 12 is a sectional view of the block which supports the lower clamps. Figs. 13 and 14 are respectively side and top views of the cam-plate which oscillates the frame and operates all the working parts of the clamping, tying, and cutting mechanism. Fig. 15 is a view showing the arrangement of the gavel-compressor. Figs. 16, 17, 18, and 19 are detail sectional views, showing the various positions of the clamping, looping, and tying devices while manipulating the cord to form the knot. Fig. 20, Sheet 5, is an end view of the block which supports the lower clamps. Fig. 21, Sheet 4, is a detail sectional view, showing the internal construction of the looping-head M.

Similar letters of reference in the several figures denote the same parts.

This invention relates to that class of grain-binders in which a flexible cord is applied around the gavel and is tied at its ends to form a band. The general principles of the machine are analogous to those of a grain-binder for which I have filed another application in the Patent Office, and some of the devices, combinations, and sub-combinations are also similar; but a new principle of operation, consisting in drawing the knot toward the gavel in tying, is practically applied, as I will hereinafter describe.

The main features of my new machine are as follows, viz:

First. A pivoted vertically-oscillating plate or frame, which supports the looping jaws or head, the lower clamp, and the cutter, and in part supports the tying-hook and the cam-plate. This feature is shown in Figs. 5 and 6, and, for convenience of description, I shall denominate it the "frame" of the tying mechanism.

Secondly. The upper clamps, which clamp and hold the two strands of the band separately above the tying mechanism during the operation of tying the ends of the band together and severing the tied band from the remainder of the cord.

Thirdly. The cam-plate, which oscillates the frame and operates all the working parts of the clamping, tying, and cutting mechanism.

Fourthly. The looping jaws or head.

Fifthly. The tying-hook.

Sixthly. The lower clamp and cutter.

Seventhly. A supplementary lever, which assists the looping-head in holding and looping the cord and presenting the loop properly to the hook. This last-mentioned element, together with the looping-head, the hook, and a flange on the block which directly supports the lower clamp and cutter, all co-operate in the act of forming the loop and drawing the severed strands through it to make the knot and accomplish the operation in such a manner that, as above indicated, the knot is drawn upward toward the gavel, thereby reducing the slack of the tied band to a minimum and making an exceedingly compact and closely-tied gavel.

I have besides these elements an improved gavel-compressor, the construction and operation of which will be hereinafter described.

In the drawings, Z is that part of the binding table or frame which directly supports the binding mechanism. A is the supporting-plate for the two pairs of upper clamps and their connected devices; B, the oscillating frame or plate, hereinabove referred to; C, the cam-plate; D, the tying-hook; M, the looping-head; I, the supplementary lever; N, the block which supports the lower clamps, and Y a wrist-pin by which the cam-plate is connected through the medium of a pitman to the driving wheel or shaft of the machine.

The driving wheel or shaft, pitman, needle, cord-supplying devices, and many other parts of the binding-machine are not here shown, because they may be of the construction shown in my Letters Patent No. 188,629, dated March 20, 1877, or in my said other application for Letters Patent, or of any other known and appropriate form and mode of operation, and therefore constitute no part of this invention.

Referring now to the construction of the several parts above indicated and shown in the drawings, and to the means by which their cooperation is effected to accomplish the work of tying the band placed around the gavel, the following is a more full and exact description thereof.

The plate A is of any suitable form, and is constructed with an opening, $a$, through which the needle operates, another opening, $a'$, to allow the binding-head to rise sufficiently while forming and tying the knot, and another larger opening, $a^2$, to accommodate the clamp arm or lever E, which is pivoted at $e^4$ to a curved rim or arm, $a^4$, as shown in Fig. 3. The plate likewise has a depression, $a^3$, in its surface to accommodate the play of the pitman E', which operates the upper clamps. The opening $a$ is made preferably in the L form represented or an equivalent form, and is guarded on one side by a vertical rib or flange, $a^5$, and on two other sides by an angular vertical rib or flange, $a^6$. The flanges $a^5$ $a^6$ do not join, but are separated by a narrow space or channel, $a^7$, through which one strand of the band extends when the binding operation is in progress. The end of the flange $a^5$ at this space is abrupt, but the end of the larger flange, $a^6$, is beveled down, so as to guide the cord down into the channel.

A friction-roller, $a^8$, may be arranged at the rear edge of the opening $a$ to diminish the friction of the needle against the plate.

The fixed jaws of the two upper clamps are shown at $e'$ $e^3$, the former being outside of the area inclosed by the ribs $a^5$ $a^6$, and immediately in front of the channel $a^7$, and the latter within such area and immediately in rear of such channel. The movable jaws of the upper clamps are shown at $e$ $e^2$, the former working in connection with the fixed jaw $e'$ outside of the needle-opening, and the latter working in connection with the fixed jaw $e^3$ in the side wall of the needle-opening, an aperture $e^5$ being made through the flange $a^6$ to allow the jaw to pass through and cross said opening. The jaw $e^2$ is provided with a projecting spur, $e^6$, which, when the jaws are closed, enters a hole in the rib $a^5$ behind the cord and prevents the latter from escaping from between the clamping-jaws.

The movable portion of the upper clamping-structure consists of an assemblage of plates, $e^7$ $e^8$ $e^9$, all pivoted to a common center, $e^4$, and designated as a whole by the letter E in the drawings. Of these three plates the middle one, $e^8$, is connected directly to the pitman E', which actuates the clamps. The upper one, $e^7$, slides laterally to a limited extent on the middle one, $e^8$, and is provided at its outer end with a right-angled arm terminating in the jaw $e$, and the lower one, $e^9$, sliding laterally under the plate $e^8$ to a limited extent, also is provided at its outer end with a right-angled arm terminating in the jaw $e^2$.

A small rubber spring, $e^{10}$, interposed between the middle plate and a flange on the plate $e^7$, gives the jaw $e$ an elastic or yielding action against its corresponding fixed jaw $e'$, while a similar spring, $e^{11}$, interposed in an analogous manner between the plate $e^8$ and a flange or shoulder of the plate, $e^9$, renders the jaw $e^2$ elastic and yielding in its action. The independent action and elasticity of the two clamps adapt them to any inequalities in the cord, and prevent any improper adjustment of them from severing the cord, breaking any of the parts, or obstructing the action of the machine. The outer end of the plate, $e^9$, rests upon a depressed flange, $e^{12}$, of the plate A, and is guided by said flange and by the opening in the rib $a^6$, through which its jaw extends. The outer end of the plate $e^7$ lies under a spur, $e^{13}$, projecting from the plate $e^9$, and is thereby properly held down to its work.

It will be observed that although the body of the plate $e^9$ lies under the plate $e^8$, its outer end extends up beyond the end of said plate $e^8$, so as to bring the two jaws, $e$ $e^2$, at the same level. By the movement of the pitman E' the middle plate, $e^8$, is oscillated back and forth, and the two jaw-plates, $e^7$ $e^9$, are carried back and forth simultaneously with it, this provision of the three plates being merely to give each jaw an independent spring action.

The force of the spring movement of the jaws may be regulated by adjusting-screws $e^{14}$ at the rear edge of the plate $e^8$, which pass in and bear against the two springs above described.

The plate A with the devices supported by it is arranged under the binding-table, which covers all its working parts except the friction-roller, the upper edge of the rib $a^6$, the fixed jaws, and the ends of the movable jaws when closed. An opening in the binding-table directly over the opening $a$ permits the needle to pass up and down. The horizontal arrangement of the upper clamps enables me to bring an extended clamping-surface to bear upon the cord between the gavel and the tying mechanism without separating the tying devices too far from the gavel, so as to leave too much slack in the tied band.

The frame B, pivoted to the bar Z at $z$, is constructed in the form shown in Figs. 5 and 6, or the equivalent thereof. At its front edge it is provided with a narrow dependent flange, $b$, and two longer flanged arms, $b'\ b'$, which support the cam-plate and hold it in proper relation to the frame, as seen in Figs. 1 and 2. It is further provided with two dependent lugs or bearings, $b^2\ b^2$, which support a rocking shaft G, and between the said bearings the frame is cut away, as shown at $b^3$, to accommodate the rocking of the shaft and its connected mechanism. It is further provided at its outer end with a curved, slotted, and inclined guide, $b^4$, which guides and limits the movement of an arm, $g$, attached to the shaft for the purpose of rocking the latter and imparting to it a limited longitudinally-sliding movement in its said bearings.

The cam-plate C is arranged under the frame B in the supports $b'\ b'$, and is provided with three slots, $c\ c'\ c^2$, as shown in Fig. 13. A strong headed bolt or stud, $z'$, projects from the bar Z through the slot $c'$ for the purpose of assisting to hold and guide the cam-plate. The cam-plate C and frame B are thus so connected together by the flanged arms $b'$ and supported by the two studs $z\ z'$ that they oscillate together on the pivots $z$, and are swung up and down by the action of the stud $z'$ in the zigzag slot $c'$ of the cam-plate; but it will be observed that the frame B has no sliding longitudinal movement, while the cam-plate has such a movement effected by the pitman that connects to the wrist-pin $y$ and limited and controlled by the form of the slot $c'$. The cam-plate is further provided with a curved slotted arm, C', containing a slot, $c^3\ c^4$, of which one end, $c^3$, is straight, and the other end, $c^4$, curved and spiral, as shown in Figs. 13 and 14. The end of the arm $g$ of shaft G extends into the slot $c^3\ c^4$, and as the cam-plate is reciprocated by the wrist-pin Y the action of the guide-slot $c^3\ c^4$ upon the arm $g$ rocks the shaft G and the parts supported thereon, while the effect of the inclined guide $b^4$ is to move the shaft lengthwise when it is thus rocking.

N is a small block or casting, rigidly fastened to the shaft G and rocking therewith. In a suitable bed or recess contained within it I arrange a pivoted bar, $n$, having a spring, $n'$, beneath its free end to force it outward with an elastic yielding pressure. At one edge of the bar $n$ is a curved projection, $n^2$, constituting the lower clamping-jaw. A little above the bar $n$ a stout arm or plate, $n^3$, extends from the block N backward and downward to a point directly in horizontal line with the jaw $n^2$, where it terminates in a flange or wide flat head, $n^4$, one edge of which projects in toward said jaw and operates as the fixed jaw of the clamp. A flange, $n^5$, extends from the lower rear edge of the block up against the lateral edge of the flange or head $n^4$, as shown, for the purpose of properly guiding the cord. The two jaws $n^2\ n^4$ are held together with considerable force by the spring $n'$. An opening exists above and another below them, as shown in Fig. 20, to accommodate a sliding plate, S, which serves to tuck the cord in between the clamps $n^2\ n^4$, and insure their proper hold upon it.

The sliding plate is provided with a slot, $s$, which bestrides the jaws $n^2\ n^4$, leaving the bifurcated ends of the plate to pass into the openings aforesaid. The plates $n^3$ S are made of steel, and the upper fork of S is provided with a sharp edge, $s'$, (see Fig. 1,) which, co-operating with the sharp edge $s^4$ of the plate $n^3$ adjacent to the opening in said plate, through or into which the fork extends, serves to sever the cord below the knot. The end of the bifurcated plate which acts as a cutter fits closely into the opening above described, so that the cord must necessarily be severed by its edge acting in connection with the edge of the opening, and even if the edges wear away or become dull the cord will continue to be severed by them, because it cannot pass through between the surfaces of the parts S $n^3$. The plate S is guided by lips or flanges $s^2$, attached to and projecting from the block N, and is actuated by a toggle-lever, H.

The connection between the toggle and the plate is effected by a grooved block, $h$, sliding on the shaft G, the end of the plate S having a flange, $s^3$, which rests in the groove, and therefore communicates any movement of the toggle to the plate S. The toggle being mounted loosely on the shaft G would be liable to rock with the shaft if it were not held in position by an arm, H', extending down alongside of it from the frame B. The toggle on the side opposite to the arm H' is provided with a pin or stud, $h'$, which works in the slot $c^2$ of the cam-plate. When the stud descends into the lower inclined end of the slot it bends the toggle or brings its arms to a sharp angle with each other, thereby drawing the plate S away from the clamping-jaws. When the stud rides up on the horizontal floor of the slot it nearly straightens the toggle-arms, thereby projecting the plate S toward the clamping-jaws and causing it to engage with the cord and force the latter between said jaws, so that they will grasp and hold it firmly. A further movement of the plate S toward the jaws causes the sharp edges $s'\ s^4$ to come together and sever the strands of cord between them, and this further movement is effected by causing the stud $h'$ to ride up over a beveled switch-bar, K, and thereby straighten the toggle-arms. The bar K is pivoted to the front side of the cam-plate, so as to extend along by the side of the slot $c^2$, and is provided with an inclined head, $k$, which extends into the slot and lies directly in the path of the stud. When the cam-plate moves back to actuate the looping mechanism the stud passes under the head $k$, lifting the latter out of its way, and after it has passed a spring, $k'$, (shown in dotted lines, Fig. 13,) depresses the head again upon the floor of the slot. When the cam-plate reaches the end of its movement in said direction and returns, the stud rides up over the head, and thus causes the cutters to sever the cord after the loop is formed and just before the tying-hook commences to draw the ends of the cord through the loop.

The looping and tying mechanism is constructed as follows:

M is a block attached to the upper side of the frame B at the points $m\ m$, and provided with two projecting lugs, $m'\ m'$, at its upper and lower rear edges, and with a deep straight groove or recess, $m^2$, extending longitudinally in its rear side between said lugs.

$M'$ is a bar, pivoted to M at $m^3$ and extending in the groove $m^2$ to the opposite end of the block, where it is provided with a projecting plate or head, $m^4$, that strikes the side walls of the groove and prevents the bar from resting on the bottom of the groove, thus forming a small opening, $t$, longitudinally through the block between the bar M′ and the bottom of groove $m^2$, as shown in Figs. 16, 17, and 21. The ends of the block M and bar M′ are fitted closely to each other and are beveled on the lower corners. The rear corner is also beveled, or, rather, it is slightly concaved, as shown at $m^5$.

U is lever, pivoted to the lugs $m'\ m'$ and having an arm, which extends in the direction of the beveled end of the parts M M′, and is there bent around laterally toward said parts, flattened, spread out, and inclined backward and upward, as shown at V. When the lever U closes against the parts M M′ its flattened inclined end V fits accurately against the upper edge of the block M, and overlaps and rests upon the top of said block, while the extremity of such flattened inclined part projects upward and backward from that point in the form of a horn. The concave $m^5$ forms a narrow channel or space between said parts U and M M′ when they are closed together, through which the cord extends at a certain stage in the looping and tying operation. The three parts V M M′ are so fitted, adjusted, and smoothed off as to present, when closed, almost the appearance of a single rounded head having a slot or opening, $t$, through it longitudinally.

Directly in front of the block M, slightly above it and between it and the bar Z, extends a lever, I, pivoted at $i$ to a pivoted plate or bar, J, and provided with a retracting-spring, $i'$. An arm, $i^2$, projecting under it from the bar Z, holds it up to its proper position, or any other suitable device may be substituted in place of the arm $i^2$ for the same purpose. This lever, near its free end, is twisted so as to present its flat side in a vertical plane and enlarge the space between it and the block M. At its extremity it is provided with a projecting head, $i^3$, which, at a certain stage of the operation, moves back against the front edge of the incline V; and it is further provided with a small sharp spur, $v$, which at the same time overlaps and bears against the outer inclined face of the part V, as shown in Fig. 17.

The lever I is connected by a rod, L, to an arm, U′, on the lever U, whereby the parts V $v$ are caused to move toward or from each other simultaneously. While so moving the lever I is free to move longitudinally also by reason of its connection to the bar J and spring $i'$.

The lever U is provided with a third arm, $U^2$, having a stud, $u$, at its end, which travels in a cam-track, O, affixed to the cam-plate C. A spring switch-bar, P, arranged across the cam-track, causes the stud $u$ to travel down on one side of the track, passing around said switch P in a manner which will be understood by skilled mechanics without further description.

The tying-hook D is supported at its rear end by lugs $d\ d$, projecting up from the side or end of the cam-track O, and it is provided with a spring, $d'$, adjusted by the nut $d^3$, which spring allows it to yield slightly in a longitudinal direction while the cutting mechanism is operating, but the extent of its yielding is limited by a nut, $d^4$, which may be adjusted on the bar. When the nut comes in contact with the bearing-lug $d$ the effect of the spring will end and the hook will be drawn by a positive unyielding force. From the lugs $d\ d$ it extends through a guide, $d^2$, and passes into the space between the block M and the bar M′ hereinabove described. A flat spring, $m^6$, resting against the bar M′, behind the lever U, presses said bar against the side of the hook with a yielding force, so that when the hook draws the severed end of the cord into the head the said severed end will become clamped between the bar M′ and the side of the hook-bar with a force sufficient to draw the knot tight; but while so clamped will gradually slip or draw through the retracting-hook, and will finally disengage itself therefrom after the knot has been completed and tightened, the clamping force of the parts D M′ being sufficient for the tension of the cord, but not strong enough to break it, nor to prevent it from drawing gradually out from between said parts. To enable the hook-bar to clamp the cord more strongly without using a spring of undue force the side of the said bar may be roughened.

The pitman E′ is connected to a lever, R, pivoted to the stud $z$. A stud, $r$, on the lower end of the lever R, travels in the slot $c$ of the cam-plate, thereby actuating the upper clamps at the proper time and in the proper manner. The form of the slot $c$ is clearly shown in Fig. 13.

The operation of these various devices is effected, as above stated, by the reciprocating cam-plate, and is as follows: The cord having been duly secured between the lower clamps in the usual manner and the needle raised, the gavel is formed upon the binding-table and the needle is ready to descend. At this juncture the cam-plate will be at its extreme left-hand movement toward the end $z^2$ of the bar Z; the hook D will be drawn back from between the block M and bar M'; the stud $r$ will be in the right-hand lower end of the slot $c$, and will hold the two upper clamps open; the stud $u$ will be at the extreme right-hand end of the cam-track O, and will hold the pin $v$ and incline V away from the head M M'; the stud $h'$ will be at the extreme right-hand end of slot $c^2$, and will hold the plate S back away from the jaws $n^2$ $n^4$; the stud or arm $g$ will be at the extreme right-hand end of the cam-guide slot $c^3$ $c^4$, and will hold the block N with its face in a vertical position, so that the cord can pass down between the end of plate S and the edge of the lower clamping-jaws; and the stud $z'$ will be at the right-hand end of slot $c'$, and will hold the cam-plate and frame B depressed away from the plate A. The needle will now descend, carrying the cord around the gavel and down through the plate A and below the lower clamp, and when in that position the cam-plate C will begin to slide toward the right hand or toward the end $z^3$ of the bar Z. As the first result of this movement the toggle-lever H and the lever R will simultaneously close both the upper and lower clamps, causing them to grasp and hold the cord tightly, the lower clamps holding both strands, and each pair of the upper clamps holding a single strand independently of each other. The stud $u$ will now strike the switch P and ride up thereon, closing the part V toward the ends of the head M M' so as to grasp both strands of the cord between them and force it against the side of the head M M'. Simultaneously the spur $v$ will advance and assume a position at the left-hand side of the cord, as shown in Fig. 17, and bear against the incline V. The stud $z'$ will now reach the inclined part of the slot $c'$, and simultaneously the stud $g$ will reach the curved part of the slot $c^3$ $c^4$, in consequence of which the cam-plate with all its attachments will begin to rise, and the block N with its attachments will begin to turn. As the head M M' V rises the pin $v$ will slide upon the incline V, engage with the cord and carry it down over the convex end of the head, the block N still rising and rocking over toward the forming loop. The pin $v$ continuing to act against the cord and the head continuing to rise, the strands held by the pin will be brought below the opening in the head, and the projecting lip or flange $n^5$ of the lower clamp will by this time have rocked over so far as to strike the other part of the cord and carry it across the strands held by the pin $v$, thereby forming a loop. At this instant the tying-hook will be thrust through the loop thus formed, and the cam-plate will arrive at the extreme right-hand limit of its movement. The cam-plate will now move to the left; the hook D will seize the crossed strands and begin to draw their ends through the loop; the toggle will immediately be straightened and cause the cord to be severed below the loop, leaving the ends of the looped portion free; the levers U and I, by the operation of the stud $u$ against the left-hand end of the switch P, will be opened, leaving the entire loop free, except the strands held by the hook; and the hook, continuing to recede, will draw the severed ends of the cord through the loop, form the knot, and tighten it in the manner above described. The loop being entirely free the knot will draw upward toward the plate A, so as to leave the minimum of slack in the tie-band. The continued movement of the cam-plate in the same direction opens the upper clamps and leaves the bound gavel ready to be discharged from the machine. It will be observed that the hook D is arranged upon a support in line with but independent of the head, so that when it is retracted it will draw entirely out, leaving a clear space between them, and that when it moves forward again its side will come in contact with the edge of the head at the bottom of the bed or groove $m^2$ and scrape or slide against or over the same. This is for the purpose of causing any filaments of the cord adhering to the hook, to be scraped off of it at the rear end of the head and be discharged from the machine, or, in other words, of cleaning the hook at each operation.

While the above-described improvements are capable of use in connection with various kinds of binders, they are, as here shown, especially adapted to that class of binders in which a section of the binding-table is movable for the purpose of more properly gathering and condensing the gavel. In binding grain the condensing and compacting of the gavel is an exceedingly important matter, and, so far as I am aware, no machine has ever been constructed which would perform that part of the work with completely satisfactory results; but the gavels have always been left somewhat loose and the band more or less slack. Now, one object of my present invention is to perfect that part of the operation; and to this end I employ, in addition to the ordinary compressor, a supplementary compressor, which exerts a rolling action upon the gavel, whereby it not only presses on the grain, but rolls it together and rolls the gavel over toward the needle while so pressing it. This rolling action is intended to imitate the operation of a skilled workman in binding grain by hand, it being common for such workmen, while drawing the band tight, to slightly roll the bundle for the purpose of working the straws into all the interstices, and thus condensing the gavel as much as possible. The means by which I accomplish this result are as follows:

Q is a torsional-spring rod, secured firmly at $q$ to the lower edge of the bar Z and extending through a bearing, $q'$, near which it is provided with an arm, $q^2$, that projects up to the upper edge of said bar. If preferred, the rod Q may be constructed with a coil, $q^3$, to increase its torsional spring force. In connection with this rod another rod, Q', is arranged at the upper edge of the bar Z, said last-mentioned rod being supported by a bearing, $q^4$, affixed to the bar Z, and by a loop in the end of the arm $q^2$. The rod Q' should be made of some springy material. After passing through the loop at the end of the arm $q^2$, as described, it is bent upward, as shown at $q^5$, and then bent around and back into the form of a long arm, $q^6$, which extends considerably below the lower edge of the bar Z and always below the surface of the binding-table on which the gavels are formed and bound.

The rod Q' $q^5$ $q^6$ may be re-enforced by a lateral rod, $q^7$, if preferred, so as to enlarge the surface which acts on the gavel, and when constructed in this form the ordinary gavel-compressor, if any is employed, should preferably be arranged to exert its action on the gavel at a point between the arm $q^5$ $q^6$ and the re-enforcing arm $q^7$, said two arms being arranged far enough apart to accommodate its movements.

In the operation of the machine the gavel is formed on the binding-table, and is in part condensed by the operation of the movable section of the table, (when such table is used,) in part by the ordinary compressor or other device employed for compacting the gavel, and in part by the needle and band; but to supplement the action of all these parts, or so many of them as may in any machine be used, the rod Q' is caused to rock in its bearings, so as to bring the arm $q^5$ $q^6$ $q^7$ up against the front side of the gavel and compress the latter back toward the needle. The rod Q' then continuing further to rock in the same direction, the torsional arm $q^2$ springs out, allowing the arm $q^5$ $q^6$ $q^7$ to bear more and more on the top of the gavel and roll the latter under it, so as to condense it by the rolling action, as above described; or, in other words, the compressor Q Q' so acts to cause its effective point of compressing contact to be applied first to the front side of the gavel and in a horizontal direction, and then to travel up over the gavel and end by applying said force on the top of the grain in a vertically-downward direction, the result of which movement is that the straws are rolled or worked together much more compactly than they could be by a force or forces acting uniformly in the same directions. The rod Q' is provided with a crank-arm, $q^8$, by which it may be rocked by a connecting-rod extending to any suitable part of the operating machinery of the machine. When the gavel has been bound the arms $q^5$ $q^6$ $q^7$ drop back to a horizontal position, the long end, $q^6$, swinging in under the machine out of the way and the gavel is discharged over the horizontal upper side of the arms $q^5$ $q^7$. When a new gavel is ready for compression the arms $q^5$ $q^7$ again rise between the old gavel and the new one, thus acting as a separator between them. If the end $q^6$ were made so short as to rise above the binding-table, it might, in commencing to descend, catch in the old gavel or straw on the outer edge of the table; but by making it of such length as never to come above the table it cannot catch, but will assist in pushing the old gavel off of the table.

Having thus described my invention, what I claim as new, is—

1. In a grain-binder, the combination of the oscillating frame B and reciprocating cam-plate C, both being pivoted at $z$, and guided and controlled by a stud, $z'$, and cam slot $c'$, substantially as and for the purpose described.

2. In a grain-binder, the combination of the pivoted oscillating frame B, the cam-plate C, pivoted with the frame B and guided by the slot $c'$ and stud $z'$, the looping mechanism, the lower clamping mechanism, and intermediate operating mechanism, substantially as described.

3. In a grain-binder, the upper clamp, E, pivoted at $e^4$, and provided with the springs $e^{10}$ $e^{11}$, and with the three arms $e^7$ $e^8$ $e^9$, substantially as described.

4. In a grain-binder, the combination of the pivoted upper clamps, $e$ $e'$ $e^2$ $e^3$, and the flanges $a^5$ $a^6$, having the space or channel $a^7$ between them, substantially as described.

5. The combination of the pointed lever I with the looping-head M and lever U, substantially as described.

6. The combination of the looping-head M, the lever U, the tying-hook, the lever I, and the upper and lower clamps, substantially as described.

7. The combination of the looping-head M, having the space or slot $t$ for the passage of the tying-hook, with a tying-hook which draws entirely through the head, so as to be cleaned at each operation, substantially as described.

8. The combination of the looping-head M and lever U, constructed and operating substantially as described.

9. The combination of the oscillating and longitudinally-moving shaft G, the toggle H, the block N, and the slide S, substantially as described.

10. The combination of a stationary upper clamp or clamps, a vertically-oscillating looping and tying head, and a rocking and vertically-oscillating lower clamp, substantially as described.

11. The combination of a stationary upper clamp or clamps, a vertically-oscillating looping and tying head, and a rocking and vertically-oscillating lower clamping and cutting mechanism, substantially as described.

12. The combination of the sliding slotted clamp-plate S with the clamping-bar $n$ $n^2$, spring $n'$, jaw $n^4$, the arms of the said slide-plate extending through openings, and means by which said plate is operated to force the cords between the clamps, and by a further movement to sever it, substantially as described.

13. In a grain-binder, the rocking compressor $q^5$, pivoted upon a yielding spring-support, and means by which it is operated, substantially as described.

14. The combination of the supplementary arm $q^7$ with the rocking arm $q^5$, supported upon a yielding spring-pivot, substantially as described.

15. A tying-hook secured to an oscillating frame and capable of being reciprocated to and from a looping-head, in combination with a screw for adjusting the same, substantially as described.

16. In a knot-tying mechanism for grain-binders, the looping-finger fitted for being projected back and forth in front of the looping-head, combined with the vibrating looper-arm, folder, hook, and mechanism to throw the ends of the cord into the hook, substantially as shown and described.

EDWARD HEATH.

Witnesses:
WM. BLACKSTOCK,
M. CHURCH.